United States Patent [19]

Snyder

[11] 4,163,586
[45] Aug. 7, 1979

[54] CONTROL SYSTEM FOR DOUBLE-ACTUATOR BRAKES

[75] Inventor: Robert C. Snyder, Country Club Hills, Ill.

[73] Assignee: Motor Wheel Corporation, Lansing, Mich.

[21] Appl. No.: 854,649

[22] Filed: Nov. 25, 1977

[51] Int. Cl.² ............................................. B60T 13/74
[52] U.S. Cl. ..................................... 303/20; 188/3 R; 188/138; 188/163; 303/7
[58] Field of Search .............. 188/3 R, 106 R, 106 A, 188/106 P, 138, 156, 158, 161, 163; 303/3, 7, 15, 20

[56] References Cited

U.S. PATENT DOCUMENTS

| | | | |
|---|---|---|---|
| 1,991,498 | 2/1935 | Dodge | 188/156 |
| 2,243,801 | 5/1941 | Gregory | 303/20 |
| 2,575,850 | 11/1951 | Swickard | 303/20 X |
| 3,350,142 | 10/1967 | Schuman | 303/20 X |
| 3,487,894 | 1/1970 | Szigeti | 188/70 |
| 3,884,530 | 5/1975 | Nilsson | 303/3 X |
| 3,981,542 | 9/1976 | Abrams et al. | 303/20 |
| 4,004,663 | 1/1977 | Stibbe | 188/138 X |
| 4,040,507 | 8/1977 | Rise | 303/7 X |

OTHER PUBLICATIONS

Warner Electric Brake and Clutch Company, Installation Instructions for 12-¼"×3-½" Utility Brake, Publication No. 819-0127, Beloit, Wisconsin, pp. 1-6.

*Primary Examiner*—Stephen G. Kunin
*Attorney, Agent, or Firm*—Barnes, Kisselle, Raisch & Choate

[57] ABSTRACT

A brake control system comprising an electric brake or the like having first and second electrically-operated brake actuators adapted for separate actuation, an operator-responsive controller for applying a first braking signal to the first actuator, and a control circuit responsive to the first braking signal for applying a second braking signal to the second actuator in substantially linear proportion to the first braking signal when the first braking signal exceeds a preselected threshold.

7 Claims, 4 Drawing Figures

CONTROL SYSTEM FOR DOUBLE-ACTUATOR BRAKES

The present invention relates to brake control systems and, more particularly, to circuits for controlling braking signals to a pair of separately-actuated, electrically-operated brake actuators.

An object of the present invention is to provide a brake control system which controls the braking forces applied by a pair of brake actuators separately from, but in controlled relation to, each other. A more specific object of the invention is to provide a brake control circuit for applying braking forces at a second of a pair of electrically-operated brake actuators in a composite or double-actuator wheel brake in proportion, and preferably in linear proportion, to operator-controlled braking forces at the first electrically-operated brake actuator.

The invention, together with additional objects, features and advantages thereof, will be best understood from the following description when read in conjunction with the accompanying drawings in which.

Figure 1:
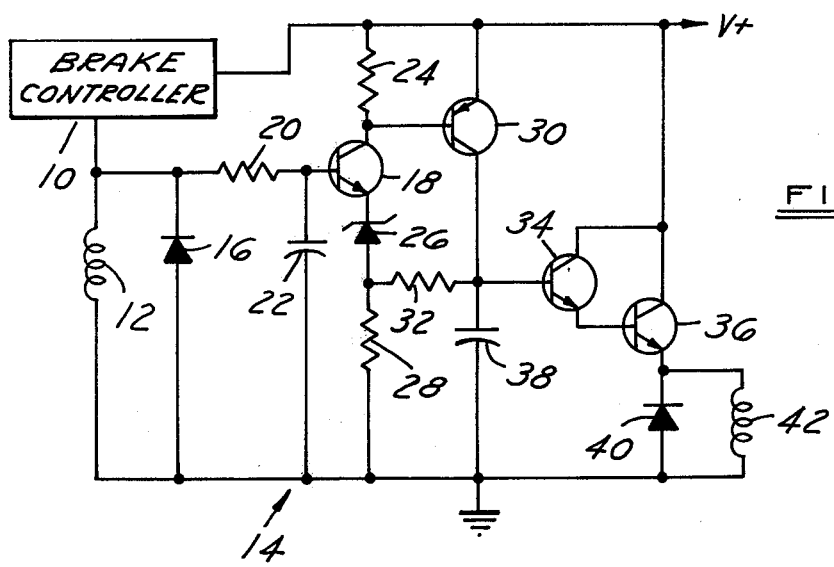
FIG. 1 is a schematic diagram of a presently preferred embodiment of the brake control system in accordance with the invention.

Referring to FIG. 1, a presently preferred embodiment of the brake control system provided by the invention comprises an operator-responsive brake controller 10 connected in series with a first electrically-operated brake actuator coil 12 of an electromagnet or puck between a positive voltage source V+, such that as a vehicle battery, and electrical ground. When the present invention is utilized to control braking forces on a trailer having at least one and preferably a plurality of braked wheels, i.e. wheels which include means capable of applying braking forces, controller 10 may be of the type shown in U.S. patent of Hubbard U.S. Pat. No. 3,371,253 or Vanden Broek U.S. Pat. No. 3,503,652, the latter of which is responsive both to direct actuation by a tractor operator through a control arm or the like and to indirect operator actuation through the tractor brake system.

A brake control circuit 14 in accordance with the invention is connected in parallel with coil 12 and comprises a diode 16 connected in reverse polarity across coil 12 to suppress inductive ringing therein. The base of an NPN transistor 18 is connected to the junction of controller 10 and coil 12 through a current limiting resistor 20, and to ground through a filtering capacitor 22. The collector of transistor 18 is connected to the voltage source V+ through a resistor 24 and the emitter of transistor 18 is connected to ground through a zener diode in series with a resistor 28. A PNP transistor 30 has its emitter connected to voltage source V+, its base connected to the collector of transistor 18, and its collector connected through a resistor 32 to the junction of resistor 28 and diode 26. A pair of NPN transistors 34,36 are connected in a typical Darlington configuration with their collector connected to voltage source V+ and the base of transistor 34 connected to the collector of transistor 30. The base of transistor 34 is also connected to ground through a capacitor 38 for added filtering and to prevent oscillation of the Darlington pair. The emitter of transistor 36 is connected to ground through a second electrically-operated brake actuator coil 42, with the usual diode 40 being connected across coil 42 to suppress inductive ringing.

In the operation of the system illustrated in FIG. 1, controller 10 applies a first braking signal to first actuator coil 12 in direct or indirect response to a vehicle operator, as indicated above. When the voltage across coil 12 exceeds a preselected threshold determined by the sum of the breakdown voltage of zener diode 26 and the conductive base-emitter voltage of transistor 18, transistors 18 and 30 begin to conduct and thereby to provide a control signal to Darlington pair 34,36 in linear proportion to the extent to which the first braking signal exceeds the preselected threshold, i.e. to the difference between the first braking signal and the preselected threshold. For example, where diode 26 has a zener breakdown voltage of 8.2 volts and the conductive base-emitter voltage drop of transistor 18 is 0.8 volts, transistors 18 and 30 will begin to conduct when the voltage across coil 12 is equal to nine volts. Resistors 28 and 32 cooperate to provide a voltage divider which controls the linear gain characteristic of the overall control circuit 14. Preferably, the linear gain characteristic provided by resistors 28,32 is selected such that the second braking signal applied to second actuator coil 42 is at a maximum level when the first braking signal to actuator coil 12 reaches its maximum level, as illustrated in FIG. 4.

Figure 2:
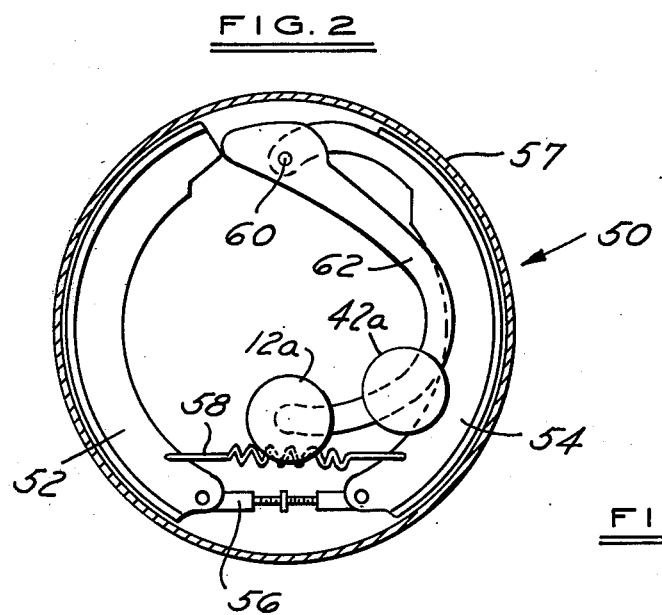
FIG. 2 is a schematic drawing of composite electric wheel brake assembly with which the present invention is particularly useful.

FIG. 2 illustrates an electric brake 50 with which the control system of FIG. 1 is particularly useful. A primary brake shoe 52 and a secondary brake shoe 54 are connected to a cross-link 56 and are biased to a normally disengaged position relative to a brake drum 57 by a spring 58. Brake shoe 54 and an arcuate actuator arm 62 are pivotally carried by an anchor pin 60 affixed to the usual backing plate (not shown). A pair of electromagnetic brake pucks 12a and 42a, which respectively include actuator coils 12 and 42 (FIG. 1), are mounted adjacent to the end of actuator arm 62 remote from pin 60. When current is applied to either of pucks 12a, 42a, the puck is attracted to an armature plate (not shown) which rotates with the associated wheel, and thereby pivots about pin 60 to cam primary shoe 52 into brake drum 57. The opposing force supplied by drum 57 to shoe 52 causes at least part of the total braking force to be transferred through link 56 to secondary shoe 54. Operation of electric brakes of the general type illustrated in FIG. 2, but having only one actuator puck, is discussed in detail in the U.S. patent of Brede et al U.S. Pat. No. 3,244,259.

Figure 3:
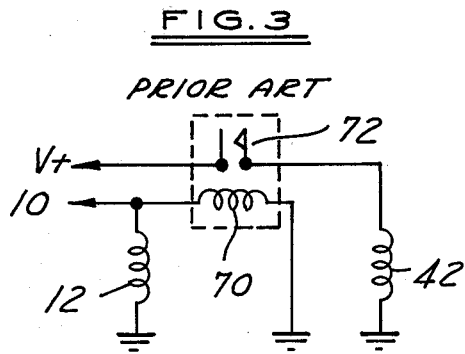
FIG. 3 is a schematic diagram of a prior art brake control system.
Figure 4:
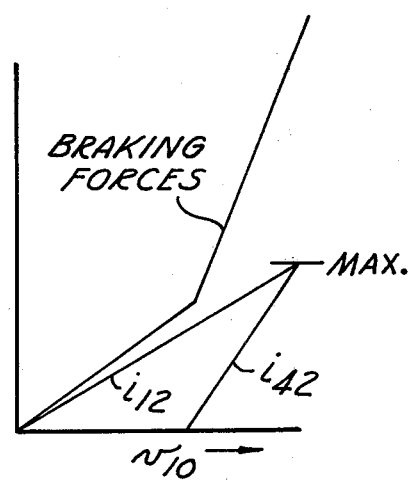
FIG. 4 is a graph illustrating operation of the system shown in FIG. 1 combined with the brake shown in FIG. 2.

FIG. 4 is a composite graph which illustrates operation of the invention shown in FIG. 1 with the electric brake 50 shown in FIG. 2. In FIG. 4, $i_{12}$ and $i_{42}$ respectively, illustrate the currents, in units of amps, to coils 12, 42 as functions of controller output voltage $V_{10}$ in volts. The resulting total developed braking force at shoes 52, 54 is also illustrated as a function of controller output. It will be evident that the total braking force available at shoes 52, 54, as applied by pucks 12a, 42a, is significantly greater than the forces made available through either puck considered alone. Moreover, the total braking force applied by both pucks is proportionally responsive to operator control throughout the entire range of actuation, and thus may be contrasted with the prior art control circuit illustrated in FIG. 3 wherein a relay coil 70 is connected across first actuator coil 12 and responsive to a threshold braking signal from controller 10 to close the normally-open relay contacts 72 and thereby to connect second brake actuator coil 42 directly to voltage source V+.

It will also be appreciated with reference to FIG. 2 that the effective radius of the actuator moment arm about the axis of pin 60 for first puck 12a is less than that for second puck 42a. Thus, the total braking force at the maximum levels of both $i_{12}$ and $i_{42}$ is somewhat greater than twice that associated with $i_{12}$ considered alone. This feature, together with the sequential and proportional puck actuation provided by the invention, has been found to yield better control of braking forces throughout the intermediate braking range than is the case with the control circuit of FIG. 3, or where both pucks are directly connected to and actuated by controller 10.

Although the control circuit 14 provided by the invention has been described in connection with a specific embodiment thereof, many alternatives and modifications are contemplated. For example, where a braked vehicle includes a number of braked wheels, each having first and second brake actuators, the various first actuators may be connected in parallel in place of coil 12 (FIG. 1) and the various second actuators may be connected in parallel in place of coil 42. Moreover, the present invention is potentially useful in its broadest aspects in successfully applying braking forces at separate first and second braked wheels each having an associated brake actuator. It has been found to be advantageous in some circumstances to maintain a current in second actuator coil 42 (FIG. 1) even when the braking signal to first actuator coil 12 drops below the above-noted threshold level. This may be readily accomplished by providing a Schmitt trigger or the like at the input to the control circuit so that the control circuit exhibits a "hysteresis" characteristic at its output. Similarly, although the invention has been described in connection with electric brakes (FIG. 2) wherein the actuator coils 12,42 are disposed in electromagnetic brake pucks, it will be appreciated that the invention is equally applicable to other types of electrically-operated brakes, such as electropneumatic or electrohydraulic brakes wherein the coils 12,42 are disposed in suitable metering valves. Indeed, the invention is intended to embrace the above-noted and all other alternatives, modifications and variations as fall within the spirit and broad scope of the appended claims.

The invention claimed is:

1. A brake control system for use on a wheeled vehicle system having at least one braked wheel comprising brake means having first and second separately actuatable electrically-operated brake actuator means disposed to apply braking forces at said at least one braked wheel and responsive to respective electrical braking signals for applying brake forces, first control means connected in series with said first actuator means for applying a first braking signal to actuate said first actuator means, and second control means connected in parallel with said first actuator means for applying a second braking signal proportional to said first braking signal to actuate said second actuator means, said brake means comprising an electric brake having brake shoe means and an actuator arm adapted to pivot about an axis which is fixed relative to said vehicle system for moving said brake shoe means into a brake drum to apply said braking forces, said first and second brake actuator means respectively comprising first and second electromagnets disposed on said actuator arm at differing moment radii with respect to said axis.

2. The brake control system set forth in claim 1 wherein said second control means includes means for applying said second braking signal to said second actuator means when said first braking signal exceeds a preselected threshold.

3. The brake control system set forth in claim 2 wherein said second braking signal is linearly proportional to the difference between said first braking signal and said preselected threshold.

4. The brake control system set forth in claim 3 wherein said first control means is responsive to an operator of said vehicle system.

5. In combination with an electrically-operated wheel brake for a wheeled vehicle and including a braking surface rotatable with a vehicle wheel, brake application means adapted to engage said braking surface to apply braking forces at the wheel, and first and second brake actuation means coupled to said brake application means for actuating said brake application means in response to respective first and second electrical braking signals, the improvement comprising means adapted to apply said respective electrical braking signals separately to said first and second brake actuation means, means responsive to a vehicle operator for applying said first electrical braking signal to said first actuator means and circuit means for applying said second electrical braking signal to said second actuator means in proportion to said first braking signal above a preselected threshold of said first braking signal, such that braking forces are applied at said wheel at a first rate below said threshold through said first actuator means as a function of said first braking signal and at a second rate greater than said first rate above said threshold through both said first and second brake actuator means as an additive function of said first and second braking signals.

6. The combination set forth in claim 5 wherein said brake application means comprise brake shoes and an actuator arm for expanding said brake shoes against a said braking surface on a brake drum, and wherein said first and second brake actuator means respectively comprise first and second electromagnets disposed on said actuator arm.

7. The combination set forth in claim 5 wherein said second braking signal is linearly proportional to the difference between said first braking signal and said preselected threshold.

* * * * *